(12) United States Patent
Carter et al.

(10) Patent No.: US 8,645,434 B2
(45) Date of Patent: Feb. 4, 2014

(54) TECHNIQUES FOR SCHEMA PRODUCTION AND TRANSFORMATION

(75) Inventors: Stephen R Carter, Spanish Fork, UT (US); Nathan Blaine Jensen, Spanish Fork, UT (US); Volker Gunnar Scheuber-Heinz, Pleasant Grove, UT (US); Charles Matthew Morgan, Springville, UT (US)

(73) Assignee: Apple Inc., Cupertino, CA (US)

( * ) Notice: Subject to any disclaimer, the term of this patent is extended or adjusted under 35 U.S.C. 154(b) by 1158 days.

(21) Appl. No.: 12/050,431

(22) Filed: Mar. 18, 2008

(65) Prior Publication Data
US 2009/0240726 A1 Sep. 24, 2009

(51) Int. Cl.
G06F 7/00 (2006.01)
G06F 17/30 (2006.01)

(52) U.S. Cl.
USPC .......................................... 707/804

(58) Field of Classification Search
USPC .................. 707/802–804, 809–810
See application file for complete search history.

(56) References Cited

U.S. PATENT DOCUMENTS

| | | | |
|---|---|---|---|
| 5,797,137 A | 8/1998 | Golshani et al. | |
| 5,806,066 A * | 9/1998 | Golshani et al. | ........................ 1/1 |
| 5,937,410 A | 8/1999 | Shen | |
| 6,980,995 B2 | 12/2005 | Charlet et al. | |
| 6,981,006 B2 | 12/2005 | Pellegrin et al. | |
| 7,003,722 B2 | 2/2006 | Rothschiller et al. | |
| 7,149,746 B2 * | 12/2006 | Fagin et al. | ..................... 707/756 |
| 7,181,734 B2 * | 2/2007 | Swamy et al. | ................. 717/144 |
| 7,330,855 B2 | 2/2008 | Mathias | |
| 7,584,163 B2 * | 9/2009 | Altenhofen et al. | ............. 706/47 |
| 8,307,012 B2 * | 11/2012 | Thomas | ......................... 707/803 |
| 2002/0116389 A1 * | 8/2002 | Chen et al. | ............... 707/103 R |
| 2003/0120665 A1 * | 6/2003 | Fox et al. | ....................... 707/100 |
| 2003/0167445 A1 * | 9/2003 | Su et al. | ......................... 715/513 |
| 2003/0225778 A1 * | 12/2003 | Fisher et al. | ................... 707/102 |
| 2004/0015783 A1 * | 1/2004 | Lennon et al. | ................. 715/523 |

(Continued)

FOREIGN PATENT DOCUMENTS

EP  1327941 A2 * 7/2003 ............... G06F 17/30

OTHER PUBLICATIONS

ERhard Rahm and Philip Bernstein, On Matching Schemas Automatically, Microsoft Research, published Feb. 2001.*

*Primary Examiner* — Jeffrey A Burke
(74) *Attorney, Agent, or Firm* — Novak Druce Connolly Bove + Quigg LLP

(57) ABSTRACT

Techniques for schema production and transformation are presented. Enterprise data from a plurality of data sources is analyzed to produce patterns to types of enterprise data. Merging rules group patterns together with entries across multiple schemas. Each schema associated with one of the data sources. A single entry is then produced within a single generic schema for each group of patterns. The generic schema can then be used to suggest changes to enterprise data policy and to make the enterprise data interoperable across the enterprise in an automated fashion.

25 Claims, 3 Drawing Sheets

(56) References Cited

U.S. PATENT DOCUMENTS

| | | |
|---|---|---|
| 2004/0044687 A1 | 3/2004 | Vachuska et al. |
| 2004/0199905 A1* | 10/2004 | Fagin et al. ............... 717/136 |
| 2005/0055369 A1* | 3/2005 | Gorelik et al. ............. 707/102 |
| 2005/0234889 A1* | 10/2005 | Fox et al. ..................... 707/3 |
| 2006/0047780 A1 | 3/2006 | Patnude |
| 2006/0173868 A1* | 8/2006 | Angele et al. .............. 707/100 |
| 2006/0271528 A1* | 11/2006 | Gorelik ......................... 707/3 |
| 2007/0055655 A1* | 3/2007 | Bernstein et al. ............. 707/3 |
| 2007/0179959 A1* | 8/2007 | Sharma et al. ............. 707/100 |
| 2008/0147704 A1* | 6/2008 | Godwin et al. ............. 707/102 |
| 2008/0168109 A1* | 7/2008 | Gaurav et al. .............. 707/203 |
| 2008/0281820 A1* | 11/2008 | Do et al. ....................... 707/6 |

* cited by examiner

TECHNIQUES FOR SCHEMA PRODUCTION AND TRANSFORMATION

BACKGROUND

A typical enterprise in today's highly automated environment can have a variety of systems and data sources. Each system can produce different versions of the same data types that the enterprise manages and tracks. So, similar or same data is often repetitively stored within the enterprise. In fact, with some data sources the information may be incomplete whereas in other data sources the information may be more robust.

The above situation occurs for a variety of reasons. Most notably, as technology evolves an enterprise may find it more convenient and more efficient, at a particular point in time, to simply replicate some data sources rather then undergo expensive porting exercises to make newer systems and older systems compatible with one another. Over time, the enterprise can end up with data sources and systems that begin to impair the effectiveness of the enterprise. The enterprise may then undergo expensive and time consuming internal fabrication overhauls to bring their infrastructure up-to-data and make it more competitive with the industry. In fact, such scenarios are part of the normal lifecycle of today's enterprises.

One problem with internal infrastructure overhauls is that they can be so large that by the time they finish, the enterprise needs to begin yet another overhaul. The capital expense and human effort that it takes for these overhauls can significantly alter an enterprise's financial picture on its annual report.

Furthermore, enterprises generally do not have an automated mechanism to view and analyze all its enterprise information in a single robust and automated fashion. This means that a plurality of disparate management, support, analysis, and report tools are needed within the enterprise. Moreover, even if such an automated mechanism did exist there is still no mechanism that permits the automated transformation between the various data sources; so, a huge manual effort is often still needed to keep enterprise information in synchronization.

Thus, improved and automated techniques are needed enterprise data management and analysis.

SUMMARY

In various embodiments, techniques for schema production and transformation are presented. More specifically and in an embodiment, a method is provided for generating a generic schema. Schemas are acquired for applications that store data in a data warehouse. Rules are applied to detect a plurality of data types defined in the schemas that match in response to patterns defined in the rules. Each data type is defined in a different one of the schemas. Finally, a master schema is generated for the data types that merges each definition for each data type from each data type's corresponding schema into a single master definition, which defines the data types as a whole within the master schema.

DETAILED DESCRIPTION

A "schema" as used herein refers to a file or table that defines a data source's structure and syntax. Some example schemas can include extensible markup language (XML) schemas, relational database schemas, directory schemas, and the like. A schema describes limitations on the structure of the universe of data that can be associated with a particular data source.

A "data source" refers to a repository for the data that a schema defines. The repository can be a relational database table, a file, a directory, etc. Moreover, a data source is produced by applications in an automated fashion or produced in a semi-automated fashion via interfaces that users interact with. Moreover, a data source can include data produced in a strictly automated fashion via processing applications and at the same time include manually entered data received from a user via a Graphical User Interface (GUI), such as World-Wide Web (WWW) site via WWW pages and interfaces, a SQL update, proprietary applications' interfaces, etc.

As used herein a "data warehouse" refers to a standard interface that ties together the data sources of an enterprise. Therefore, the data warehouse can include various combinations of files, documents, directories, relational databases, etc.

Various embodiments of this invention can be implemented in existing network architectures. For example, in some embodiments, the techniques presented herein are implemented in whole or in part in the Novell® network and proxy server products, directory services products, operating system products, and/or identity based products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
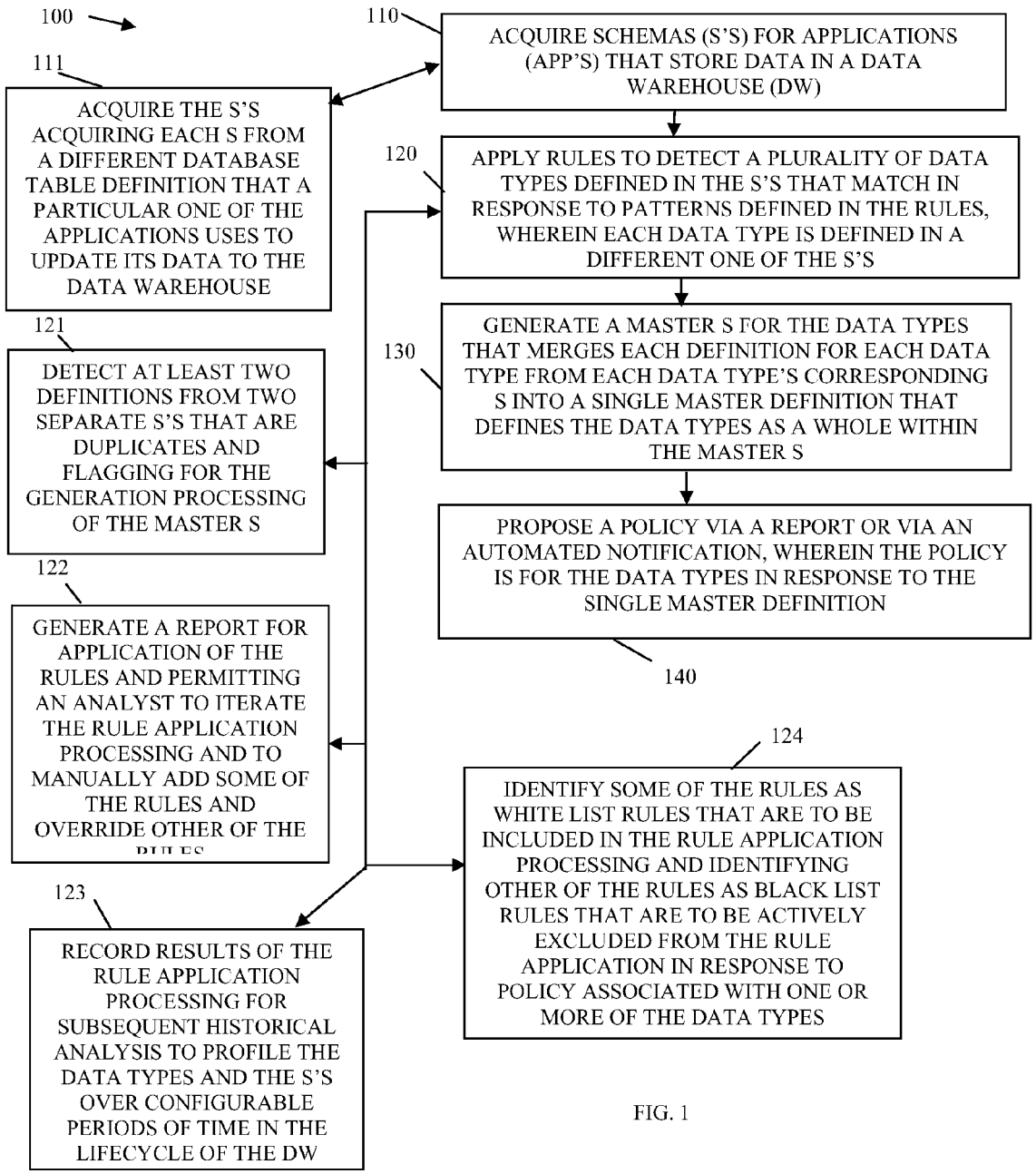
FIG. 1 is a diagram of a method for generating a generic schema, according to an example embodiment.

FIG. 1 is a diagram of a method 100 for generating a generic schema, according to an example embodiment. The method 100 (hereinafter "generic schema generation service") is implemented in a machine-accessible and readable medium. The generic schema generation service is operational over and processes within a network. The network may be wired, wireless, or a combination of wired and wireless.

At 110, the generic schema generation service acquires schemas for applications that store data in an enterprise's data warehouse. Acquisition can occur in a variety of manners.

For example, at 111, the generic schema generation service acquires each schema from a different database table definition that a particular one of the applications uses to update its data to the data warehouse. Stated another way, the data source, which the applications write and update their data to, is a relational database and the relational table includes a data definition that is the schema. It is noted, that this just as easily can be a directory or file schema, when an application is using a data source associated with a file or directory.

Additionally, the schema can be acquired by identifying the applications, such as via a unique identifier or identity that is managed by an enterprise security service, such as an identity manager. An administrator can manually identify the applications, via their identifiers, and then access a policy store or use the identity manager to acquire schemas for each of the applications. The schemas define the input and output data used and produced by the applications.

So, the schema can be for the application or for the data source that the application writes and updates its data to.

At 120, the generic schema generation service applies rules for detecting a plurality of data types defined in the schemas. For example, a particular schema may define a date data type. The rules may be formatting commands that permit a variety of different date types to be detected as patterns within the data source associated with the schemas or when produced as output from the applications to which the schemas are associated.

Some example data rules may include but are not limited to: mm/dd/yy; mm/dd/yyyy; dd/mm/yy; dd/mm/yyyy; MONTHNAME,YEAR, etc., where mm stands for two digit month, dd stands for two digit day of a month, yy or yyyy stands for a two digit or four digit year, MONTHNAME stands for a spelled out name or even abbreviation for a month, and YEAR stands for a spelled out year. It is apparent that a variety of different formats can be defined in the rules for different data types. Other data types can include but are not limited to department name, organization name, employee or customer name, account, etc.

In some cases, pattern analyzers can be pre-processed against the data sources to suggest the rules. The rules can then be defined in response to the patterns suggested by the pattern analyzer.

It is also noted that the schema also identifies how to identify different fields or entries in the data. For example, a particular data source may use tags (such as XML) to identify specific entries or fields while a database uses row and column identifiers and separators. Other data sources may use special character delimiters, such as hex unprintable characters, line feeds, punctuation characters, etc. Still other data sources may use character positions, such as the first 10 characters are to be associated with last name, etc. So, the schema can define how a particular data type is to be identified as well as what type of data type is being recognized.

This information from the schema along with rules as defined above permit the generic schema generation service to identify patterns for particular data types across a plurality of applications and their data sources.

Additionally, in an embodiment at 121, detects at least two definitions from the separate schemas that are duplicates and then flags these duplicates for the schema generation processing, described below with reference to the processing at 130. In other words, a first application may define name in a format as LAST-NAME, FIRST-NAME, MIDDLE-INITIAL while a second application defines the same format for an entry in the schema identifies as full-name. Both name and full-name are duplicates but this may never be detected in an automated manner because each are associated with different applications and data sources and each use a different schema identifier or entry identifier, namely: name and full-name. The generic schema generation service can automatically detect this situation and flag the entries from two different and separate schemas as being duplicates of one another. This is useful because the schema generation processing can use this to treat both name and full-name as if they were the same, since the formatting is identical for each and includes the same data types (strings separated by commas).

In another embodiment, at 122, the generic schema generation service generates a report for application (processing) of the rules. The report can detail the patterns detected, the schema used, the rule used, the data source or application assigned to the schema, etc. A data analyst can use the report to then iterate over what the generic schema generation service did in producing the patterns, via the rules, and manually add some rules or override some other rules. The analyst may then force the processing of the generic schema generation service at 120 to iterate another time to produce another report and determine if that is acceptable to the analyst. So, an automated approach to manual intervention can be integrated into the processing of the generic schema generation service. This is done on the assumption that there may be some particular needs of an enterprise that the analyst is aware of and wants to ensure takes place when the generic schema generation service produces the patterns.

In still another case, at 123, the generic schema generation service records the results of the rule application (rule processing) for subsequent historical analysis. This permits profiling the data types, data sources, and schemas over configurable period of times associated with the life cycle of the enterprise's data warehouse. For example, a trend analysis may show that the enterprise is growing into a global workforce and as such traditional U.S. based telephone numbers are evolving to include country codes that were not needed and not used in prior time periods of the enterprise when the enterprise was limited to a U.S. only marketplace. Such situations can lead to policy changes throughout the enterprise with respect to data formats, such as telephone numbers.

According to an embodiment, at 124, the generic schema generation service identifies some rules that are associated with a white list policy indicating that these white list rules are to included in the rule application processing and at the same time identifies other rules that are associated with a black list policy indicating that the black list rules are to be actively excluded from the rule application processing. This can be done for a variety of reasons. For example, government regulations for financial data may require that certain data types be processed and reported by an enterprise in a particular format, an overriding white list policy can ensure that the generic schema generation service always processes these white list rules. In another case, a black list rule may indicate that data types are never to be combined because of similar regulations or internal guidelines, these too can be captured via a black list rule.

At 130, the generic schema generation service generates a master schema for the data types that merges each definition for each data from each data type's corresponding schema into a single master definition that defines the data types as whole within the master schema.

For example, suppose one data source or application produces a 10 digit phone number that includes the 3 digit U.S.-based area code and the traditional 7 digit phone number within that area code while another data source produces a 13 digit phone number that adds a 3 digit country code. Each phone number is defined in each data source's schema: one as being 10 digits and one as being 13 digits. Both are associated with a same data type namely phone number. The generic schema generation service sees two entries that are the same from two different schemas and sees each has a different schema definition, namely 10 digits versus 13 digits. The generic schema generation service combines the two separate schema entries into one single schema entry in the master schema having a single definition of: "13 digits (the most restrictive limitation from the two separate schemas) or 10 digits." Now, a single entry in the master schema can be used for both data sources.

Policy can be associated with the entry to determine when 13 is appropriate and when 10 is appropriate. Moreover, in some cases actions may state that on first access to a 10 digit phone number in a particular data source it is to be converted to the 13 digit country code format. Still further policy or profiles may state that when requested by a user the phone number should by default be displayed in a 13 or 10 digit format depending upon the location and preferences of the user. All this information can be defined and/or referenced via a single master schema entry.

In an embodiment, at 140, the generic schema generation service can even dynamically and automatically propose a new policy via a report or via an automated notification (email, website, text message, etc.). The new policy is for an identified data type as now defined in the single master definition for the single master schema. So, in the example presented above an email can be sent to an administrator saying half of the data defines a phone number in 10 digit format whereas half defines the same data type in 13 digit format thus policy should be considered for change to use the more restrictive 13 digit format to make enterprise data consistent.

It is noted that some legacy applications may still rely on the 10 digit format so the administrator may not want to make the change, in these cases the techniques discussed above can be used so that the data is automatically converted to the 10 digit format before being delivered to these applications and automatically converted to a 13 digit format when received from these applications for update. This ensures that legacy application processing is not broken and can continue to seamless process without manual intervention and yet the underlying data model for the enterprise is more consistent and robust and can support even more applications that rely on the 13 digit phone format.

Figure 2:
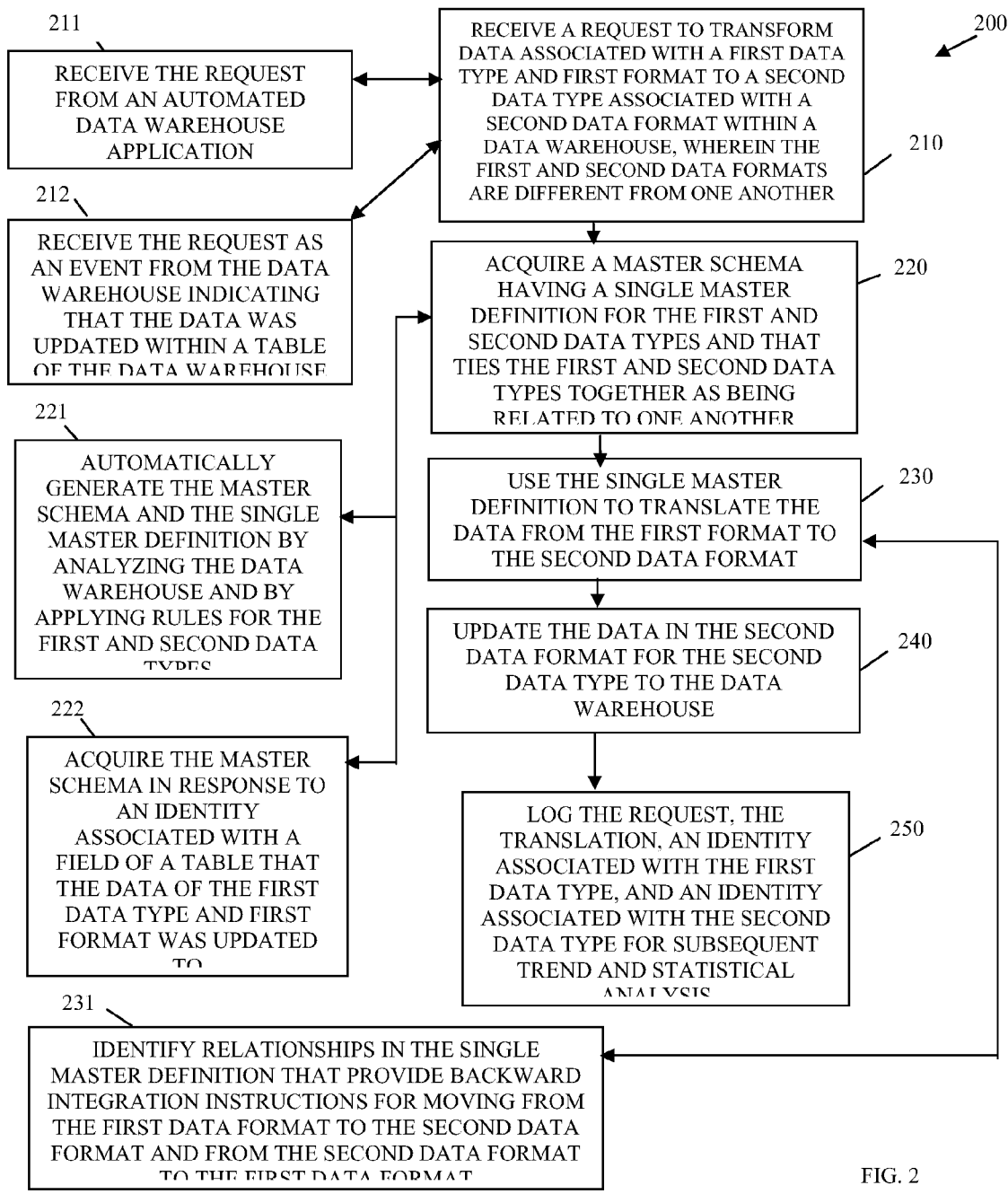
FIG. 2 is a diagram of a method for transforming data between disparate data types and schemas, according to an example embodiment.

FIG. 2 is a diagram of a method 200 for transforming data between disparate data types and schemas, according to an example embodiment. The method 200 (hereinafter "schema transformation service" is implemented in a machine-accessible and readable medium and is operational over a network. The network may be wired, wireless, or a combination of wired and wireless.

In an embodiment, the schema transformation service uses a generic schema produced by the generic schema generation service, which is represented by the method 100 of the FIG. 1 and which is discussed above.

At 210, the schema transformation service receives a request to transform data associated with a first data type and first format to a second data type associated with a second data format within a data warehouse. The first and second data types are different from one another. In other words, one data type may define a data type as name that includes first, last, and middle initial whereas the second data type defines a customer data type having sub data types for last name, first name, and middle initial. The data types are different from one another and not the same since each have different identifiers to identify them (name and customer) and since each have different structure (name: first, last, and middle initial and customer: last name, first name, and middle initial).

In an embodiment, at 211, the schema transformation service receives the request from an automated data warehouse application. For example, a query used in SQL can be issued to generate a report from the data warehouse. The query spawns other data warehouse applications to produce the report and in response to this the schema transformation service receives the initial request. It is noted that this does not have to be an automated data warehouse application as any automated application can spawn or force the request to be raised as an event or as an action detected by the schema transformation service.

In another case, at 212, the schema transformation service receives the request as an event from the data warehouse indicating that the data was updated within a table of the data warehouse. So, database or data store triggers can alert the schema transformation service when data associated with schemas being monitored are updated with some volatile operation (merge, create, delete, modify, etc.).

At 220, the schema transformation service acquires a master schema that has a single master definition for the first and second data types and that ties the first and second data types together as being related to one another.

Processing associated with the master schema itself was described in detail above with reference to the method 100 of the FIG. 1. Thus, at 221, the schema transformation service automatically generates the master schema and the single master definition by analyzing the data warehouse and by applying rules for the first and second data types.

Also, in our example presented above, the master definition can have a single entry defined as name that includes last name, first name, and middle initial and that permits name to be referenced as either customer or name to accommodate both different data types defined in two different data sources as different data types.

According to an embodiment, at 222, the schema transformation service acquires the master schema and the single master definition in response to an identity associated with a field of a table that the data of the first data type and first format was updated to. So, the first data type can include an identity that can be used to query an identity manager or some location service which returns the master schema and a pointer or link to the single master definition that also incorporates the second data type.

At 230, the schema transformation service uses the single master definition to translate the data from the first format to the second data format. This can occur in a variety of manners.

For example, at 231, a relationship can be identified by the schema transformation service in the single master definition that provides backward integration instructions fro moving from the first data format to the second data format and from the second data format to the first data format.

In our continuing example, suppose the single master definition includes the following information "entry=name; id=A,A-entry=name,string=first-name,last-name,middle-initial,delimiter=,;id=B,B-entry=customer,string=last-name,first-name,middle-initial,delimiter=/" This single definition can permit the schema transformation service to parse the second data type using a "/" delimiter and provide the corresponding backward structure and format in a first data type format and vice-versa. The first application is identified via id=A and its data type is "A-entry=name" the second application is identified via id=B and its data type is "B-entry=customer." The subcomponents in this example match namely "first-name, last-name, and middle-initial; so, the schema transformation service can acquire from a first data type from a first source as name=Steve,Carter,R the components of first-name=Steve, last-name=Carter, and middle-initial=R; next, this can be populated to a recognized format of the second application B in a second data type format as customer=Carter/Steve/R.

It is noted that a single example was presented for comprehension as to one example scenario as to how the transformation can take place. A variety of other techniques can be used, using pattern recognition, rules, and field or entry identifiers to permit automated transformation between disparate data types and applications.

Accordingly, at 240, the schema transformation service automatically and dynamically (in real time—during processing) updates the data in the second data format for the second data type to the data warehouse. A second application, which may have been the initial requester, can then access the data warehouse and acquire the data in a format that it understands. Alternatively, an intermediary application can acquire the data from the data warehouse and supply it to the second application, if the second application is a legacy application and is not being modified to accommodate the novel processing discussed herein. In other words, once the schema transformation service has in real processing time transformed the first data type to a desired second data type the mechanism by which the data in the second data type can be communicated to the second application that uses that data in the second data type can be customized or can vary depending upon the architecture of the processing environment.

In an embodiment, at 250, the schema transformation service logs the initial request, the translation (transformation), an identity associated with the first data type, and an identity associated with the second data type for subsequent trend analysis and statistical analysis.

This can be useful for a variety of reasons; for example, an enterprise may determine that the vast majority of enterprise transactions in fact use the second data type and not the first, such that it may be more beneficial to the enterprise to natively store the second data type and to translate as needed back to the first data type to save on enterprise processing and transaction resources.

Other reasons may also exist, such as a trend appears that in the near future the second data type is becoming a standard that maybe the enterprise to begin migrating to and away from the first data type or maybe a new data policy is needed within the enterprise in response to an emerging trend.

Figure 3:
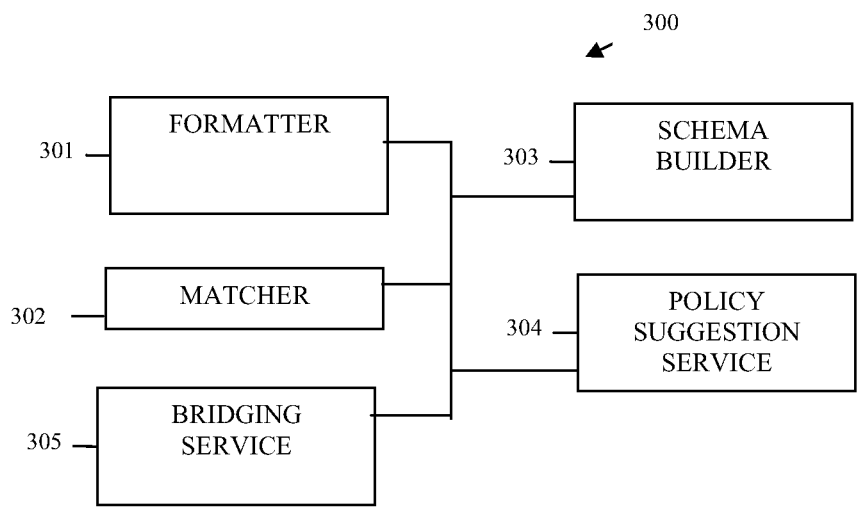
FIG. 3 is a diagram of a schema generation and transformation system, according to an example embodiment.

FIG. 3 is a diagram of a schema generation and transformation system 300, according to an example embodiment. The schema generation and transformation system 300 is implemented in a machine-accessible and readable medium as instructions that process on one or more machines of a network. Moreover, the schema generation and transformation system 300 is operational over the network; the network may be wired, wireless, or a combination of wired and wireless.

In an embodiment, the schema generation and transformation system 300 implements, among other things, the generic schema generation service and the schema transformation service represented by the methods 100 and 200 of the FIGS. 1 and 2, respectively.

The schema generation and transformation system 300 includes a formatter 301, a matcher 302, and a schema builder 303. In some embodiments, the schema generation and transformation system 300 also includes a policy suggestion service 304 and/or a bridging service 305. Each of these will now be discussed in turn.

The formatter 301 is implemented in a machine-accessible and computer-readable medium as instructions that execute on a machine (computer or processor-enabled device) of the network. Example processing associated with the registration service 301 was presented in detail above with reference to the method 100 of the FIG. 1.

The formatter 301 processes against a plurality of data sources to define patterns for entries in the data. In some cases, the formatter 301 can use rules for recognized data types or can process against the raw data proposing patterns, such as finding a dollar sign followed by a string of digits and then a period followed by two more digits. So, the formatter 301 can be processed according to predefined pattern rules for predefined data types and/or the formatter 301 can process on its own to propose patterns it detects from serially processing data sources. The formatter 301 keeps metadata related to the patterns it finds, such as pattern X found in source Y for data field or type Z and found N times. This can be automatically processed by the subsequent components and/or can be manually inspected and altered by a data analyst if desired in the manners discussed above with reference to the method 100 of the FIG. 1. So, the formatter 301 produces a report of its actions.

The matcher 302 is implemented in a machine-accessible and computer-readable medium as instructions that execute on the machine. Example processing associated with the matcher 302 was presented in detail above with reference to the method 100 of the FIG. 1.

The matcher 302 consumes (uses as input data) the output or report produced by the formatter 301. The matcher 302 groups the patterns together and matches each grouping to a particular entry for schemas associated with the data sources. So, in the example presented above with the method 200 of the FIG. 2, the matcher 302 groups the name and customer data types and their patterns into a single grouping that points to the name entry of the schema for one data source and that points to the customer entry of the schema for the other data source. There is one schema for each separate data source that the formatter 301 analyzes.

In an embodiment, the matcher 302 also flags duplicate patterns from the patterns that the formatter 301 and also generates a report of its own for the data sources having the flags. This may serve as a source of information that an enterprise can use to merge some data sources together into a single data source.

The matcher 302 assist in establishing relationships between patterns. The matcher 302 may also use merging rules that predefine such relationships, such as data type X from source A is to be associated with data type Y from source B. So, some relationships may be automatically derived when schema entry names are the same and other relationships may be automatically assigned in response to predefined data analyst rules that the matcher 302 consumes and evaluates when grouping the patterns.

The schema builder 303 is implemented in a machine-accessible and computer-readable as instructions that execute on the machine or an entirely different machine of the network. Example processing associated with the builder was presented in detail above with reference to the method 100 of the FIG. 1.

The schema builder 303 uses each grouping to build a generic schema for all the schemas. Techniques for achieving this was discussed in detail above with reference to the method 100 of the FIG. 1.

In an embodiment, the generic schema provides a mechanism for integrating application data between disparate applications. Each disparate application and its application data is associated with one of the data sources.

According to an embodiment, the schema generation and transformation system 300 also includes a policy suggestion service 304. The policy suggestion service 304 is implemented in a computer-readable as instructions that execute on the machine or an entirely different machine of the network.

The policy suggestion service 304 evaluates an enterprise policy store for each of the entries of the schemas in view of a mapped entry in the generic schema and in response suggests at least one new enterprise policy for at least one grouping. For example, a default enterprise policy may be to represent a phone number in 10 digits but an emerging trend discovered by the policy suggestion service 304 may indicate that the default enterprise policy should be changed to represent a phone number as 13 digits that includes a country code.

In still another embodiment, the schema generation and transformation system 300 also includes a bridging service 305. The bridging service 305 is implemented in a computer-readable as instructions that execute on any machine of the network.

The bridging service 305 uses the generic schema to translate between groupings of the schemas. Example processing and techniques associated with doing this were described in detail above with reference to the method 200 of the FIG. 2.

Figure 4:
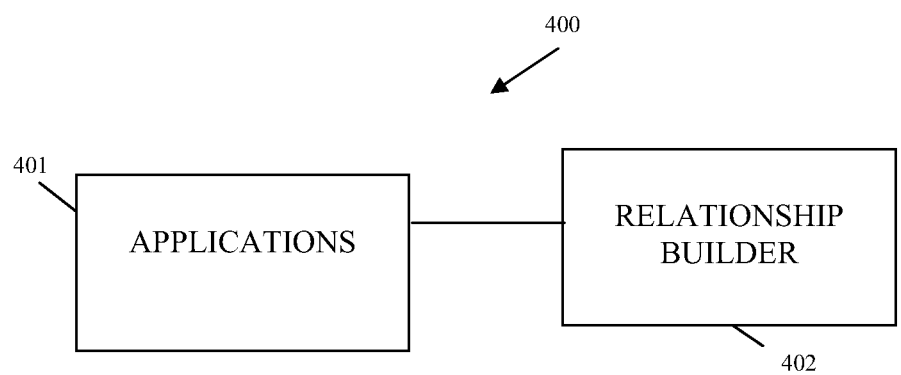
FIG. 4 is a diagram of another schema generation and transformation system, according to an example embodiment.

FIG. 4 is a diagram of another schema generation and transformation system 400, according to an example embodiment. The schema generation and transformation system 400 is implemented in a machine-accessible and computer-readable medium and is processed on machines a network. The network may be wired, wireless, or a combination of wired and wireless. In an embodiment, the schema generation and transformation system 400 implements among other things the generic schema generation service and the schema transformation service represented by the methods 100 and 200 of the FIGS. 1 and 2, respectively. Also, the schema generation and transformation system 400 presents and alternative arrangement and perspective to the schema generation and transformation system 300 discussed above with reference to the FIG. 3.

The schema generation and transformation system 400 includes applications 402 and relationship builder 402. Each of these and their interactions with one another will now be discussed in turn.

The applications 401 are each implemented in a machine-accessible and computer-readable medium as instructions that process on same or different machines of the network.

Each application 401 produces application data housed in a particular data source. Each data source includes its own schema and that schema defines structure and syntax for data included in that data source. The schema may be directly associated with the output produced by the application 401 or by a data source that the output associated with the application 401 is stored.

The relationship builder 402 is implemented in a machine-accessible and computer-readable medium as instructions that process on any machine of the network. Example processing associated with the relationship builder 402 was presented in detail within the discussion associated with the method 100 of the FIG. 1.

The relationship builder 402 evaluates the data from the data sources and the schemas of those data sources to define a single generic schema. The single generic schema is used to define all of the data sources and their schemas. The generic schema is used to permit data produced between disparate applications 401 to be interoperable between those disparate applications 401.

In other words, two applications 401 that cannot initially use data produced by one another can be made interoperable via the generic schema that dynamically translates data between the applications and makes the data interoperable.

In an embodiment, the relationship builder 402 evaluates the data by producing patterns of the data defined in the data source in response to formatting rules. The relationship builder 402 then groups selective ones of the patterns together in response to merging rules. Next, the relationship builder 402 associates each group of the patterns with a particular entry in the generic schema. Finally, the relationship builder 402 produces a plurality of reports that detail the patterns, the data sources, and each group's association with a corresponding entry in the generic schema. The details associated with this was described in detail above with reference to the method 100 of the FIG. 1 and with respect to the system 300 of the FIG. 3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method residing in an non-transitory computer-readable medium and for executing on a machine, the machine configured to process the method, comprising:
   acquiring, by the machine, schemas for applications that store data in a data warehouse, unique identities for the applications are used to access a policy store and obtain the schemas that define input and output data used and produced by the applications;
   automatically, by the machine, applying rules to detect a plurality of data types defined in the schemas that match in response to patterns defined in the rules, wherein each data type is defined in a different one of the schemas; and
   automatically and dynamically generating, by the machine, a master schema for the data types that merges each definition for each data type from each data type's corresponding schema into a single master definition that defines the data types as a whole within the master schema.

2. The method of claim 1, wherein acquiring the schemas acquiring each schema from a different database table definition that a particular one of the applications uses to update its data to the data warehouse.

3. The method of claim 1, wherein applying further includes detecting at least two definitions from two separate schemas that are duplicates and flagging for the generation processing of the master schema.

4. The method of claim 1, wherein applying further includes generating a report for application of the rules and permitting an analyst to iterate the rule application processing and to manually add some of the rules and override other of the rules.

5. The method of claim 1, wherein applying further includes recording results of the rule application processing for subsequent historical analysis to profile the data types and the schemas over configurable periods of time in the lifecycle of the data warehouse.

6. The method of claim 1, wherein applying further includes identifying some of the rules as white list rules that are to be included in the rule application processing and identifying other of the rules as black list rules that are to be actively excluded from the rule application in response to policy associated with one or more of the data types.

7. The method of claim 1 further comprising, proposing, by the machine, a policy via a report or via an automated notification, wherein the policy is for the data types in response to the single master definition.

8. A machine-implemented method residing in an non-transitory computer-readable medium and for executing on a machine, the machine configured to process the method, comprising:
   applying rules to detect a first data type associated with a first format and a second data type associated with a second data format defined in one or more schemas that match in response to patterns defined in the rules;
   receiving, by the machine, a request to transform data associated with the first data type and the first format to the second data type associated with the second data format within a data warehouse, wherein the first and second data formats are different from one another having different structure and using different identifiers to identify parts of their structure;
   acquiring, by the machine, a master schema having a single master definition for the first and second data types and that ties the first and second data types together as being related to one another the master schema automatically and dynamically generated;
   using, by the machine, the single master definition to translate the data from the first format to the second data format; and
   updating, by the machine, the data in the second data format for the second data type to the data warehouse.

9. The method of claim 8, wherein receiving further includes receiving the request from an automated data warehouse application.

10. The method of claim 8, wherein receiving further includes receiving the request as an event from the data warehouse indicating that the data was updated within a table of the data warehouse.

11. The method of claim 8, wherein acquiring further includes automatically generating the master schema and the single master definition by analyzing the data warehouse and by applying rules for the first and second data types.

12. The method of claim 8, wherein acquiring further includes acquiring the master schema in response to an identity associated with a field of a table that the data of the first data type and first format was updated to.

13. The method of claim 8, wherein using further includes identifying relationships in the single master definition that provide backward integration instructions for moving from the first data format to the second data format and from the second data format to the first data format.

14. The method of claim 8 further comprising, logging, by the machine, the request, the translation, an identity associated with the first data type, and an identity associated with the second data type for subsequent trend and statistical analysis.

15. A machine-implemented system, comprising:
   a machine configured for executing a formatter implemented in a non-transitory tangible computer-readable medium that executes on the machine;
   the machine further configured for executing a matcher implemented in a non-transitory tangible computer-readable medium that executes on the machine; and
   the machine or a different machine configured for executing a schema builder implemented in a non-transitory tangible computer-readable medium that executes on the machine or the different machine of a network;
   wherein the formatter automatically and dynamically processes against a plurality of data sources by applying rules to detect patterns for entries in the data sources, the formatter processes against raw data in the data sources proposing the patterns from the raw data, and wherein the matcher automatically and dynamically groups the patterns together and matches each grouping to a particular entry in schemas, and wherein there is one schema for each separate data source, and wherein the schema builder uses each grouping to automatically and dynamically build a generic schema for all the schemas.

16. The system of claim 15, wherein the matcher flags duplicate patterns from the patterns and generates a report for the data sources having the flags.

17. The system of claim 15 further comprising, a policy suggestion service implemented in a machine-accessible and computer-readable medium and to process on any machine of the network, wherein the policy suggestion service evaluates an enterprise policy store for each of the entries of the schemas in view of a mapped entry in the generic schema and in response suggests at least one new enterprise policy for at least one grouping.

18. The system of claim 15 further comprising, a bridging service implemented in a machine-accessible and computer-readable medium and to process on any machine of the network, wherein the bridging service uses the generic schema to translate data between groupings of the schemas.

19. The system of claim 15, wherein the formatter produces a report for the patterns discovered in the data sources.

20. The system of claim 15, wherein the generic schema provides a mechanism for integrating application data between disparate applications, where each disparate application and its application data is associated with one of the data sources.

21. A machine-implemented system, comprising:
   a machine configured for executing applications implemented in a non-transitory tangible and computer-readable medium and accessible to process on the machine or multiple machines of a network; and
   the machine or the multiple machines configured for executing a relationship builder implemented in a non-transitory and computer-readable medium and to execute one of the machines of the network;
   wherein each application produces application data housed in a data source, and wherein each data source includes its own schema defining data in that data source by structure and syntax, and wherein the relationship builder automatically and dynamically evaluates the data from the data sources and the schemas of those data sources by applying rules to detect patterns for entries in the data sources, and
   wherein the relationship builder automatically and dynamically defines a generic schema that can be used to define all of the data sources and their schemas, and wherein the generic schema is used to permit data produced between disparate applications to be interoperable between the disparate applications.

22. The system of claim 21, wherein the relationship builder evaluates the data by producing patterns of the data defined in the data sources in response to formatting rules.

23. The system of claim 22, wherein the relationship builder groups selective patterns together in response to merging rules.

24. The system of claim 23, wherein the relationship builder associates each group of patterns with an entry in the generic schema.

25. The system of claim 24, wherein the relationship builder produces a plurality of reports that detail the patterns, the data sources, and each group's association with a corresponding entry in the generic schema.

* * * * *